(12) United States Patent
Prust et al.

(10) Patent No.: US 7,472,695 B2
(45) Date of Patent: Jan. 6, 2009

(54) CONTROLLER FOR AIR INTAKE HEATER

(75) Inventors: Andrew J. Prust, Oshkosh, WI (US);
Jan P. Thimmesch, Eden Prairie, MN (US); Chadwick P. Anderson, New Prague, MN (US); Alan P. Gill, Batavia, IL (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 0 days.

(21) Appl. No.: 11/311,837

(22) Filed: Dec. 19, 2005

(65) Prior Publication Data

US 2006/0150959 A1 Jul. 13, 2006

Related U.S. Application Data

(63) Continuation-in-part of application No. PCT/US2004/024079, filed on Jul. 27, 2004.

(60) Provisional application No. 60/490,456, filed on Jul. 28, 2003.

(51) Int. Cl.
*F02G 5/00* (2006.01)

(52) U.S. Cl. ...................................... 123/549

(58) Field of Classification Search .......... 123/543–557
See application file for complete search history.

(56) References Cited

U.S. PATENT DOCUMENTS

| | | | |
|---|---|---|---|
| 4,034,204 A | 7/1977 | Windsor et al. | |
| 4,122,679 A * | 10/1978 | Charron ........................ | 60/599 |
| 4,372,261 A | 2/1983 | Sarto | |
| 4,545,357 A | 10/1985 | Kearsley et al. | |
| 4,667,645 A | 5/1987 | Gluckman | |
| 4,944,260 A | 7/1990 | Shea et al. | |
| 5,094,198 A | 3/1992 | Trotta et al. | |
| 5,186,045 A | 2/1993 | Matsuoka et al. | |
| 5,334,818 A | 8/1994 | Edwards et al. | |
| 5,347,966 A | 9/1994 | Mahon et al. | |
| 5,350,114 A | 9/1994 | Nelson et al. | |
| 5,482,013 A | 1/1996 | Andrews et al. | |
| 5,632,917 A * | 5/1997 | Cummins et al. ........... | 219/497 |
| 5,634,443 A | 6/1997 | Mathews | |
| 5,743,242 A | 4/1998 | Thimmesch | |
| 5,887,575 A | 3/1999 | Thimmesch et al. | |
| 5,988,146 A | 11/1999 | Anderson et al. | |
| 5,990,459 A | 11/1999 | Feustel et al. | |
| 5,992,399 A | 11/1999 | Anderson et al. | |
| 6,031,204 A | 2/2000 | Prust et al. | |
| 6,040,557 A | 3/2000 | Prust et al. | |

(Continued)

OTHER PUBLICATIONS

Printout from Beru AG website of press release regarding electronic control unit for the instant start system (ISS) for diesel engines dated Apr. 15, 2002.

(Continued)

*Primary Examiner*—M. McMahon
(74) *Attorney, Agent, or Firm*—Harness, Dickey & Pierce, P.L.C.

(57) ABSTRACT

An air intake heater system includes an air heater adapted to be positioned in communication with an intake passageway of an engine and a controller. The controller is operable to repeatedly supply current and discontinue the supply of current to provide a desired energy output of the air heater.

13 Claims, 12 Drawing Sheets

U.S. PATENT DOCUMENTS

| | | | |
|---|---|---|---|
| 6,073,615 | A | 6/2000 | Anderson et al. |
| 6,085,519 | A * | 7/2000 | Prior et al. .................. 60/304 |
| 6,119,665 | A | 9/2000 | Anderson et al. |
| 6,138,645 | A | 10/2000 | Joppig et al. |
| 6,152,117 | A | 11/2000 | Prust |
| 6,242,712 | B1 | 6/2001 | Prust |
| 6,354,256 | B1 | 3/2002 | Ohanian et al. |
| 6,359,424 | B2 | 3/2002 | Iida et al. |
| 6,392,207 | B2 | 5/2002 | Beetz et al. |
| 6,651,632 | B2 | 11/2003 | Thimmesch |
| 6,700,105 | B2 | 3/2004 | Morrison |
| 6,712,032 | B2 | 3/2004 | Uhl et al. |
| 6,715,472 | B2 | 4/2004 | Stephan et al. |
| 6,736,098 | B2 | 5/2004 | Toedter et al. |
| 6,843,218 | B2 | 1/2005 | Kumada et al. |
| 6,872,922 | B2 | 3/2005 | Uhl |
| 6,875,960 | B2 | 4/2005 | Yamaguchi et al. |
| 6,906,288 | B2 | 6/2005 | Toedter et al. |
| 6,911,630 | B2 | 6/2005 | Neckel |
| 6,928,992 | B1 * | 8/2005 | Holmes ..................... 123/557 |
| 6,964,269 | B2 | 11/2005 | Gschwind et al. |
| 7,044,115 | B2 | 5/2006 | Gschwind et al. |
| 2002/0000221 | A1 | 1/2002 | Kilb et al. |
| 2002/0092492 | A1 | 7/2002 | Ohanian et al. |
| 2002/0092508 | A1 | 7/2002 | Kanekawa et al. |
| 2003/0029405 | A1 | 2/2003 | Toedter et al. |
| 2004/0003800 | A1 | 1/2004 | Gschwind et al. |
| 2004/0025852 | A1 | 2/2004 | Kanekawa et al. |
| 2004/0056018 | A1 | 3/2004 | Uhl |
| 2004/0255889 | A1 | 12/2004 | Kumada et al. |
| 2005/0039732 | A1 | 2/2005 | Toedter et al. |
| 2005/0235970 | A1 | 10/2005 | Carretero |
| 2005/0257781 | A1 | 11/2005 | Linkenhoger |
| 2007/0039596 | A1 | 2/2007 | Navalon Carretero |
| 2007/0062497 | A1 | 3/2007 | Joppig et al. |

OTHER PUBLICATIONS

Printout from Beru AG website of press release regarding sensors and electronics from Beru dated Apr. 15, 2002.

Printout from Beru AG website of press release regarding Mercedes starts with Beru ISS dated Feb. 20, 2003.

Printout from Beru AG website of product information regarding High-Tech Glow Plugs for Pre-Heating and Post-Heating believed to be publically available before Dec. 19, 2005.

* cited by examiner

CONTROLLER FOR AIR INTAKE HEATER

CROSS-REFERENCE TO RELATED APPLICATIONS

This application is a continuation-in-part of International Application No. PCT/US2004/024079, filed on Jul. 27, 2004, which claims the priority of U.S. Provisional Application No. 60/490,456, filed on Jul. 28, 2003. The disclosures of the above applications are incorporated herein by reference.

BACKGROUND AND SUMMARY OF THE INVENTION

The present invention generally relates to a heater system for an air intake of an automotive vehicle. More particularly, the present invention relates to a stand alone heater control system which incorporates pulse width modulation to produce a desired intake air heating cycle.

Electrically powered air intake heaters are useful for heating air as it enters the intake of an internal combustion engine. Depending on the thermal conditions of the engine and the ambient air, it may be desirable to heat the intake air prior to attempting to start the engine. Typically, the air is heated for a predefined time based on the ambient air temperature.

Many air intake heaters are coupled to an electrical circuit including a battery, a battery cable, a common connector, another wire, a fuse, yet another wire, a relay and a final wire to the air heater. The relay is typically controlled by the engine electronic control module. Based on signals received from the electronic control module, the relay supplies current to the heater or does not. In addition to the plurality of wires noted in the above circuit, metal supports and hardware are required to attach the components to the vehicle.

Additionally, the heater is typically sized to provide a desired wattage based on engine size and duty cycle. Typically, air heaters are sized such that the full battery voltage and current may be supplied to the heater for a defined period of time. This control scheme often requires the heater to be energized for approximately thirty seconds when ambient temperatures are low such as minus twenty degrees Fahrenheit. While heaters controlled and sized in this manner have been effective, improvements may exist.

An air intake heater system of the present invention includes a controller coupled to the air heater. The controller and air heater are designed so that they can preferably be coupled to the battery using a single wire. The controller may function as a stand alone unit or may accept data from the vehicle electronic control module. The controller of the present invention utilizes a pulse width modulation control scheme where the total energy per unit time output from the air heater is controlled. Therefore, a larger air heater may be implemented than previously used. By implementing a larger air heater, the time required to preheat the air is drastically reduced. In addition, production efficiencies can be achieved since the same heater construction can be used for different engines.

Preferably, the air heater system of the present invention collects engine rpm data after the engine has been started. The system utilizes the data to determine the duration and quantity of energy output from the heater after engine starting to ensure smooth idle. In this manner, the total energy output by the air heater is minimized. In addition, the emissions and running characteristics during initial start up are improved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
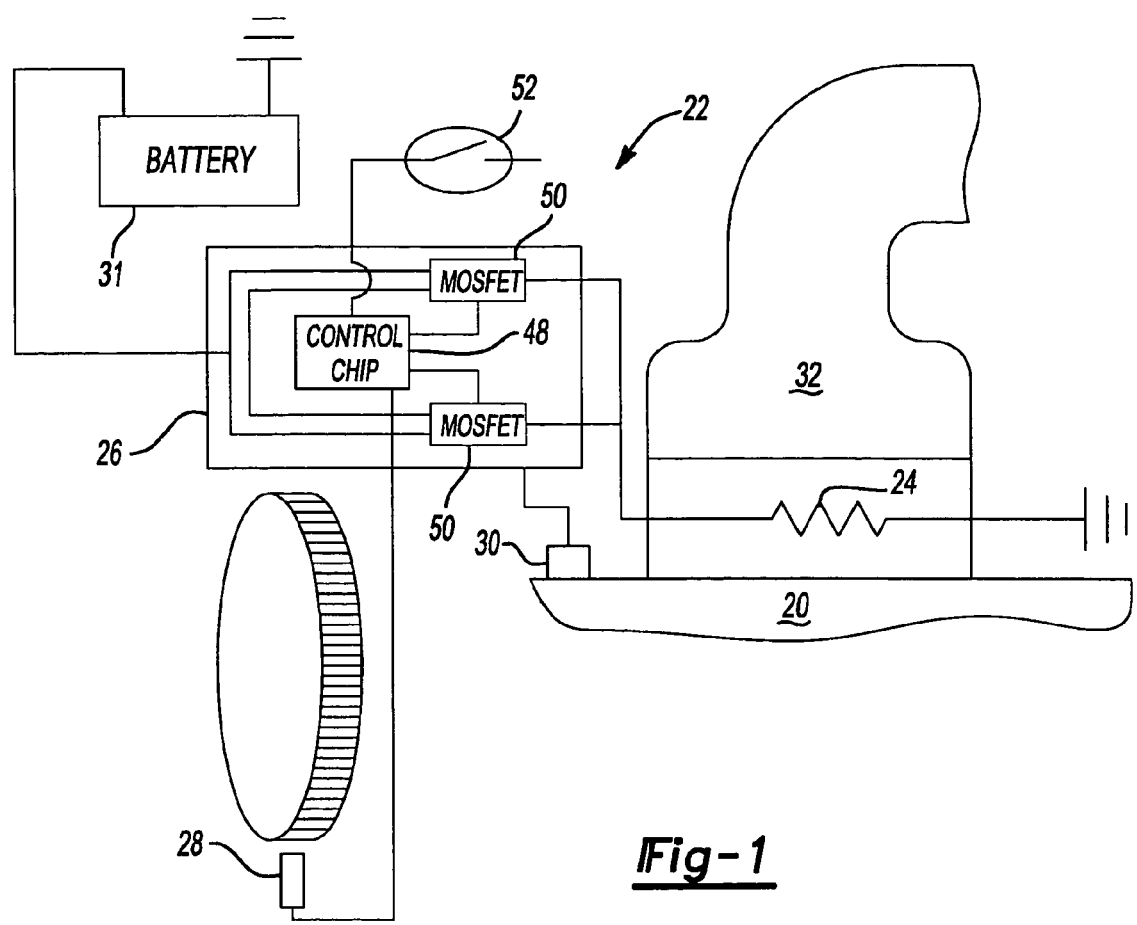
FIG. 1 is a schematic representing an exemplary vehicle equipped with an air intake heater system constructed in accordance with the teachings of the present invention.
Figure 1A:
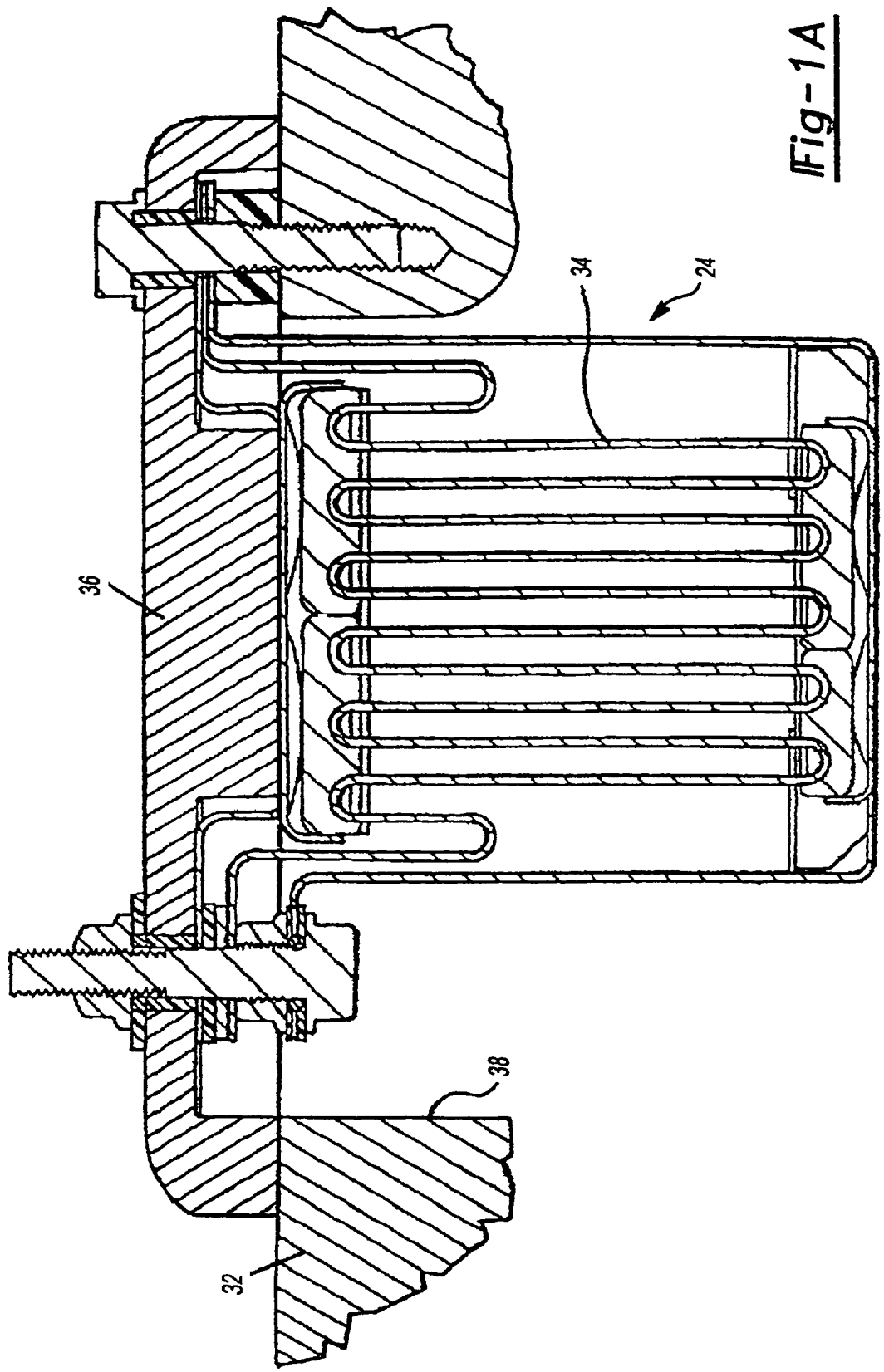
FIG. 1(a) is a view of a preferred air heater.

With reference to FIG. 1, an exemplary engine 20 is shown in communication with an air intake heater system 22 constructed in accordance with the teachings of the present invention. System 22 includes an air heater 24, a controller 26, an rpm sensor 28 and a temperature sensor 30. A battery 31 provides electrical energy to controller 26 and air heater 24. FIG. 1 depicts air heater 24 positioned between engine 20 and an inlet tube 32. Alternatively, the air heater 24 is of the "drop in" type as depicted in FIG. 1(a).

When configured as a "drop in" heater, heater 24 includes a heating element 34 coupled to an access panel 36. Heating element 34 is positioned within an aperture 38 of inlet tube 32. In this manner, heating element 34 is placed in communication with air traveling through inlet tube 32 toward the combustion chambers of engine 20. Access panel 36 sealingly engages inlet tube 32 to restrict undesirable ingress of contaminants. Further details of the air heater can be found in U.S. Pat. No. 6,073,615, which is incorporated by reference herein.

Figure 2:
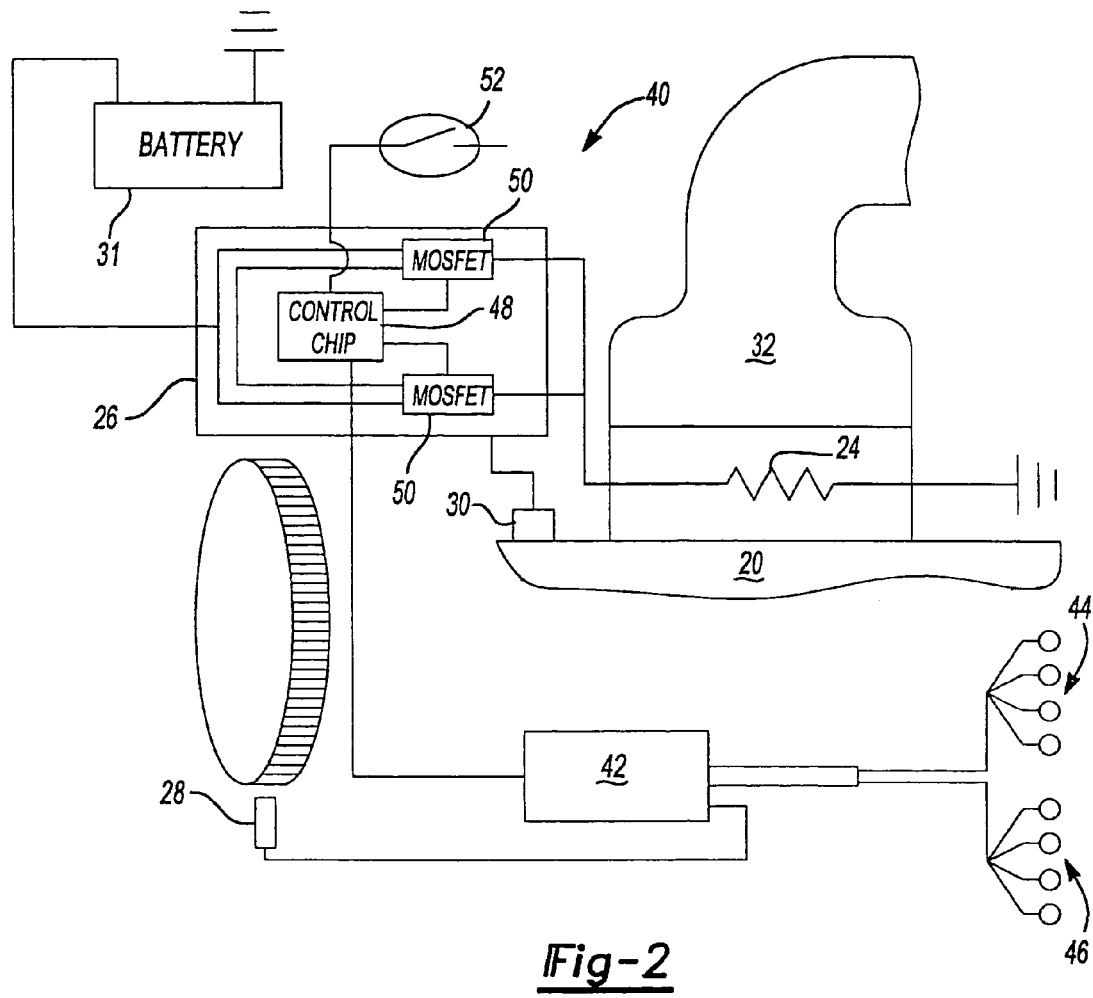
FIG. 2 is an alternate air intake heater system in which a connection to a vehicle electric control module is made.

An alternate air heater system 40 is depicted in FIG. 2. Heater system 40 utilizes inputs provided by an electronic control module 42. Electronic control module 42 collects data from a sensor bank 44 and a diagnostic bank 46. Sensor bank 44 includes an oil temperature sensor, a coolant temperature sensor, an ambient temperature sensor and individual engine cylinder temperature sensors. Diagnostic bank 46 includes data reflecting battery voltage, the strength of the battery and other vehicle system values.

Both heater systems 22 and 40 incorporate pulse width modulation of power field effect transistors (MOSFETS) to control the heater wattage. Specifically, an integrated circuit or control chip 48 controls the pulse width of MOSFET type transistors 50 based on the inputs to the system. Voltage regulators and other management devices may be required to keep the control chip and the MOSFETS stable during operation of the device. These components will maintain the voltage to the system and do miscellaneous management of the integrated circuit board for operation.

Inputs to the chip include rpm sensor 28 and the ambient temperature sensor in sensor bank 44. The ambient temperature sensor will determine the on time of the heater for preheat to warm heating element 34 up to temperature to transfer heat to the engine during cranking. This can be a linear or non-linear function based on the joule values required for startup. A representative graph is shown in FIG. 3.

In this particular embodiment, the formula for preheat time may be calculated by any one of the formulas below which could be linear or nonlinear functions. Linear functions are normally preferred when a simple model is desired such as when computation time must be kept to a minimum. Non-linear functions may be preferred when the system characteristics are more clearly understood or when it is desirable to input more or less energy than a linear model. For example, the preheat time is determined by taking the temperature x, say −10° F. and inputting it into one of the equations set forth below to get a preheat time as shown in the following table:

| Linear Function | Non-Linear Functions | |
|---|---|---|
| $Y = -0.125x + 5$ | $Y = -0.0013x^2 - 0.125x + 7$ | $Y = 0.0013x^2 - 0.125x + 3$ |
| $Y = (-0.125 * -10) + 5$ | $Y = [-0.0013 * (-10)^2] - (0.125 * -10) + 7$ | $Y = [0.0013 * (-10)^2] - (0.125 * -10) + 3$ |
| $Y = 1.25 + 5 = 6.25$ seconds | $Y = -0.13 + 1.25 + 7 = 8.12$ seconds | $Y = 0.13 + 1.25 + 3 = 4.38$ seconds |

Figure 3:
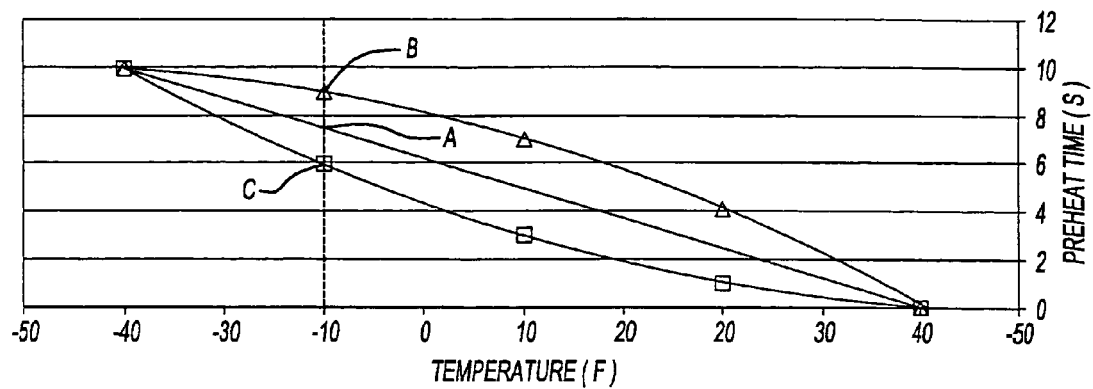
FIG. 3 is a graph used to determine the duration of preheat time based on temperature.

If the linear function is chosen, the controller will initially supply power to the air heater for 6.25 seconds as depicted at point A in FIG. 3. If the upper non-linear function is chosen, the air heater will receive power for 8.12 seconds (point B). If the lower non-linear function is programmed within controller 26, air heater 24 will be energized at full power for 4.38 seconds as shown at point C.

Figure 4:
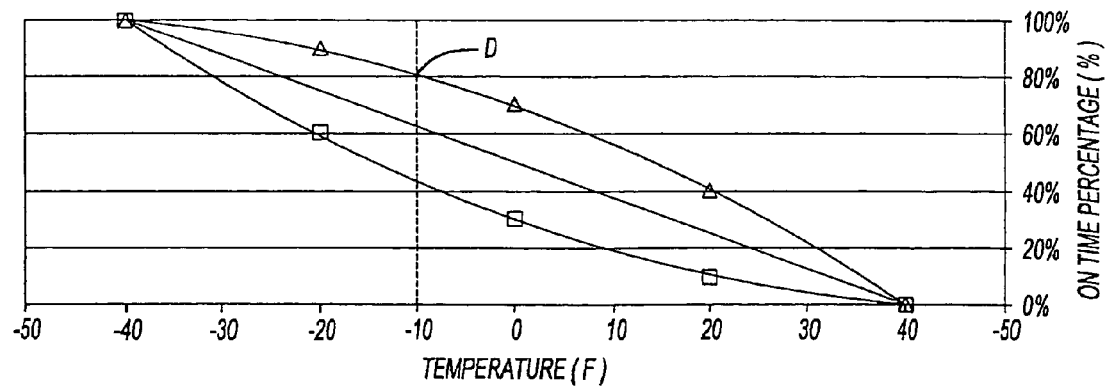
FIG. 4 is a graph useful for determining the on time percentage of an air intake heater based on a temperature.

After the preheat duration has been completed, a signal is generated to the operator to indicate that the engine may be started. Once the engine has started, the rpm sensor will read an rpm value, signaling the controller that the post heat program can begin. Post heat refers to heating which occurs after the engine is started. The heater system starts out at a pulse width on time percentage that is determined by the ambient temperature. A representative on time percentage vs. temperature graph is depicted at FIG. 4. The percentage on time is calculated by a linear or non-linear function to determine that starting point for the pulse width percentage. The functions for determining on time percentage include:

| Linear Function | Non-Linear Functions | |
|---|---|---|
| $Y = -0.0125x + .5$ | $Y = -0.00013x^2 - 0.0125x + 0.7$ | $Y = 0.00013x^2 - 0.0125x + 0.3$ |

Assuming the ambient temperature is −10° F., a linear model is chosen for the preheat (as discussed above) and a nonlinear model is chosen for the post heat pulse width calculation. Examples of the preheat and post heat calculations are as follows:

| Preheat Calculation | Post heat Calculation |
|---|---|
| $Y = -0.125x + 5$ | $Y = -0.00013x^2 - 0.0125x + 0.7$ |
| $Y = (-0.125 * -10) + 5$ | $Y = [-0.00013 * (-10)^2] - (0.0125 * -10) + 0.7$ |
| $Y = 1.25 + 5 = 6.25$ seconds | $Y = -0.013 + 0.125 + 0.7 = .812$ or 81.2% |

Thus, once the 6.25 second preheat has been completed and the engine has been started, the controller will calculate an 81.2% pulse width as depicted at point D. Power is applied to the heater for 81.2% of the normal duty cycle of the pulses. Then, the controller decreases the pulse width and checks for a change in the engine rpm. If there is no change to the engine rpm after a decrease in the pulse width (or less than a certain percentage change, i.e., 2%), then the new pulse width is acceptable and it can be reduced again. If there is a change in the engine rpm due to the lowered pulse width, the controller will return to the original pulse width and restart the process. Eventually, as the engine warms up, a decrease in the pulse width will have no affect on the rpm and the controller will migrate to a 0% pulse width, essentially turning itself off.

Figure 5:
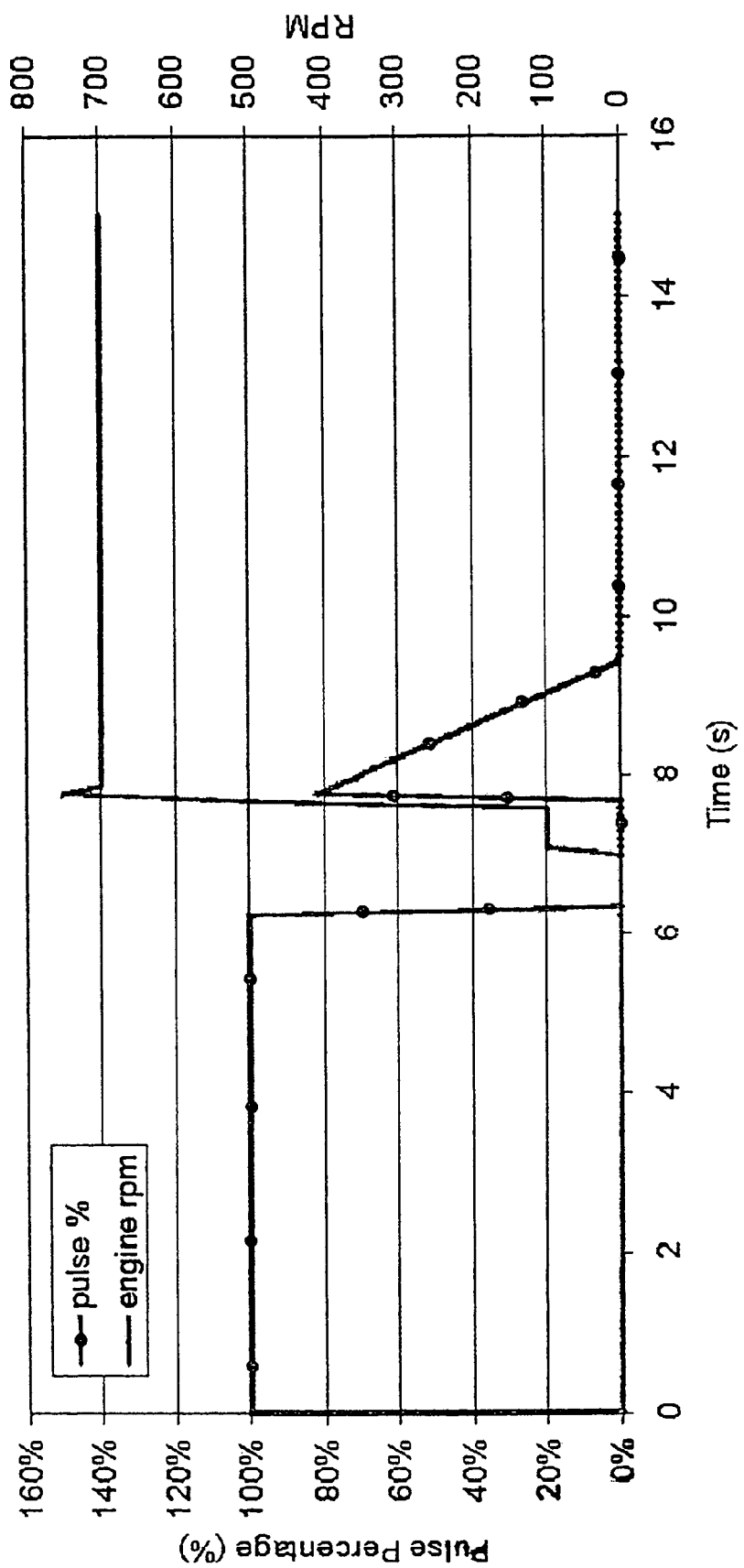
FIG. 5 is a graph representing a first control scenario depicting pulse percentage, time and engine rpm.

Ideally an engine start would follow the trace of FIG. 5. Preheat takes place and the engine is started. As the pulse width is decreased, there is no change in the engine rpm. The controller reaches 0% pulse width and the start is completed.

Figure 6:
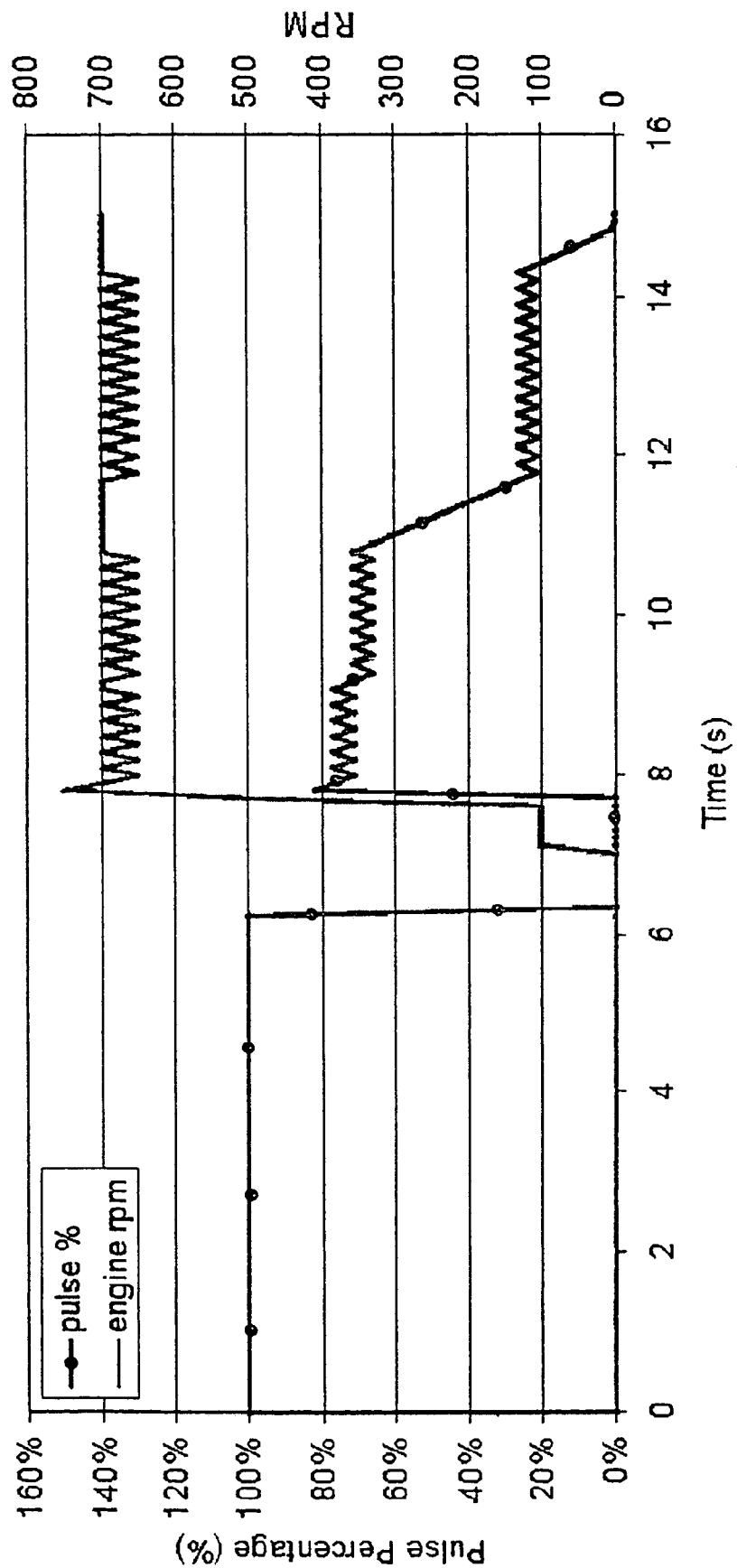
FIG. 6 is a graph depicting a second control scenario.

A second scenario is shown in FIG. 6. The preheat takes place and the engine is started. The first time the controller reduces the pulse width, the engine rpm drops, causing the controller to return to the previous pulse width. This process takes place until there is no change in the rpm (at approximately the 11 second mark) where the controller goes through a number of reductions with no change to engine rpm. At approximately the 12 second mark, there is another change in the engine rpm so the process is repeated until at approximately 14 seconds. Once no change in rpm occurs, the controller may again continue to reduce the on time of the heater.

Figure 7:
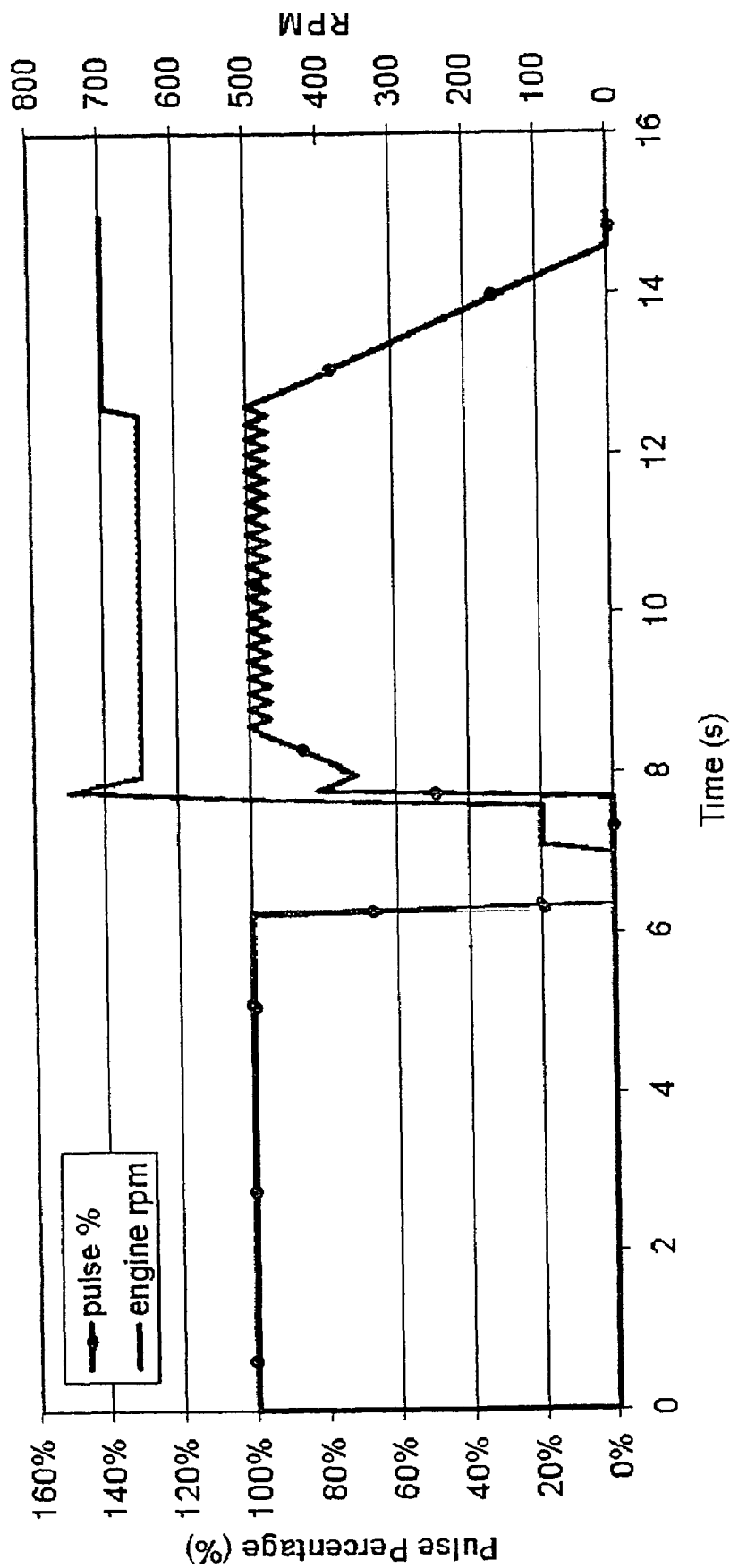
FIG. 7 is a graph depicting a third control scenario.

With reference to FIG. 7, a third scenario is presented. In this situation, the initial post heat pulse width percentage is not sufficient to keep the engine running. If the pulse width is not sufficient to keep the engine above the necessary rpm for start, the controller will increase the necessary on percentage to keep the engine running. As the engine warms, the above scenarios will develop and the controller will again migrate to a 0% pulse width.

Considerations for the control of the system include the responsiveness of the rpm sensor, the frequency of sampling, the required frequency of changes to the controller to keep the system in control, and the lag time of the system to changes in the heat from the heater.

An alternate temperature sensor (not shown) may be used to sense the temperature of the air some distance downstream of the heater. The temperature of the air downstream from the heater is more representative of the temperature of air actually, entering the cylinders. If the air is controlled at a prescribed temperature that can be related to ability of the heater to start the engine, an improved starting control will result. If an engine will start unaided at 40° F. and if the air some distance from the heater, say 2 inches, is 100° F. and can be shown to give air in the cylinders that is 50° F. through testing of the engine, the engine will be in a state where an acceptable start will occur. Post heat can then take place not based on time but on the air temperature leaving the heater. Comparison of this air temperature and the affects of the air temperature on the rpm of the vehicle can then be used for control. As the downstream air temperature is varied, the effect on engine rpm is measured. A closed loop control algorithm can be established as previously described.

Figure 8:
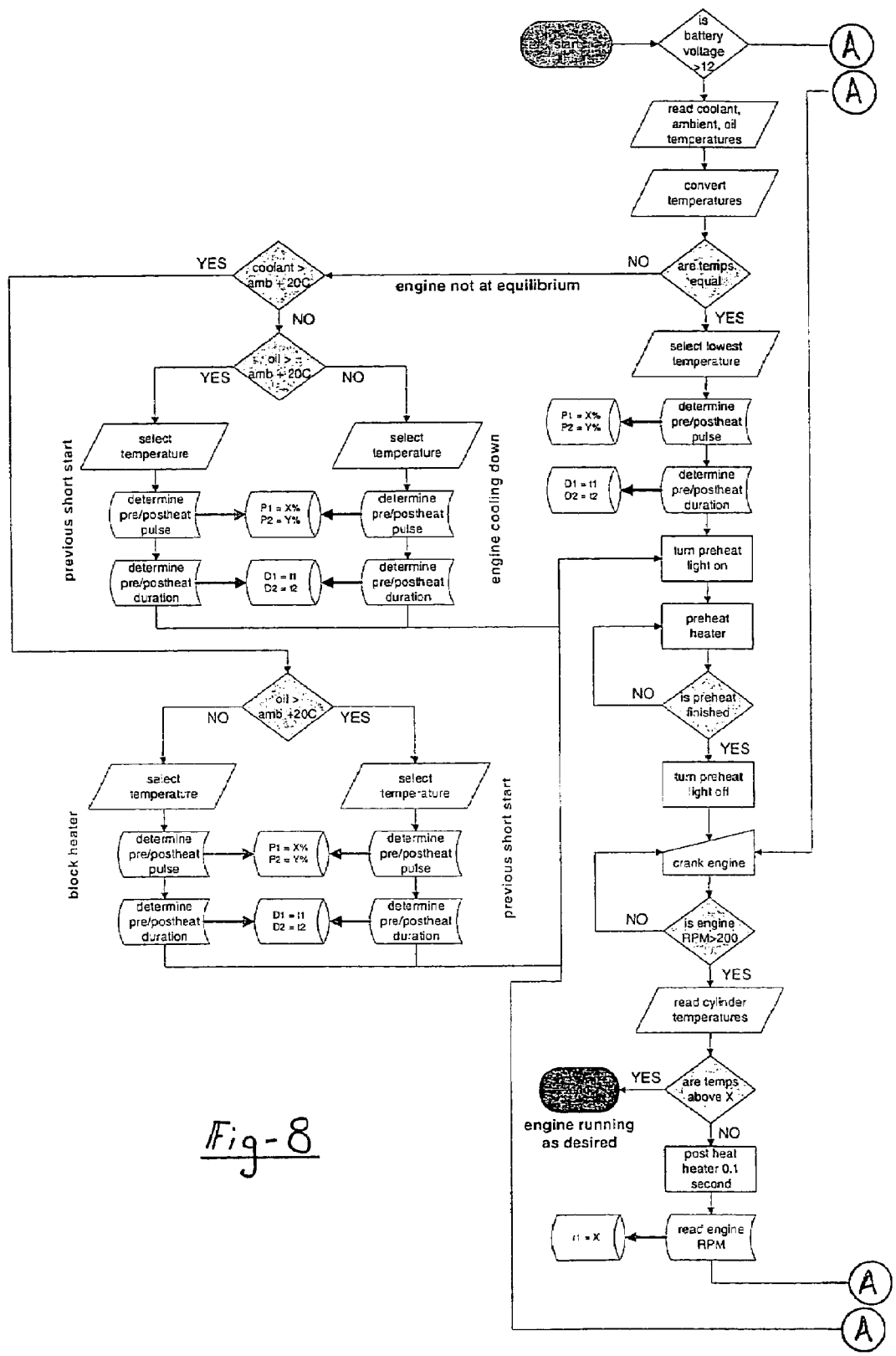
FIGS. 8-10 depict a flow chart outlining an exemplary heater control process in accordance with the teachings of the present invention.
Figure 9:
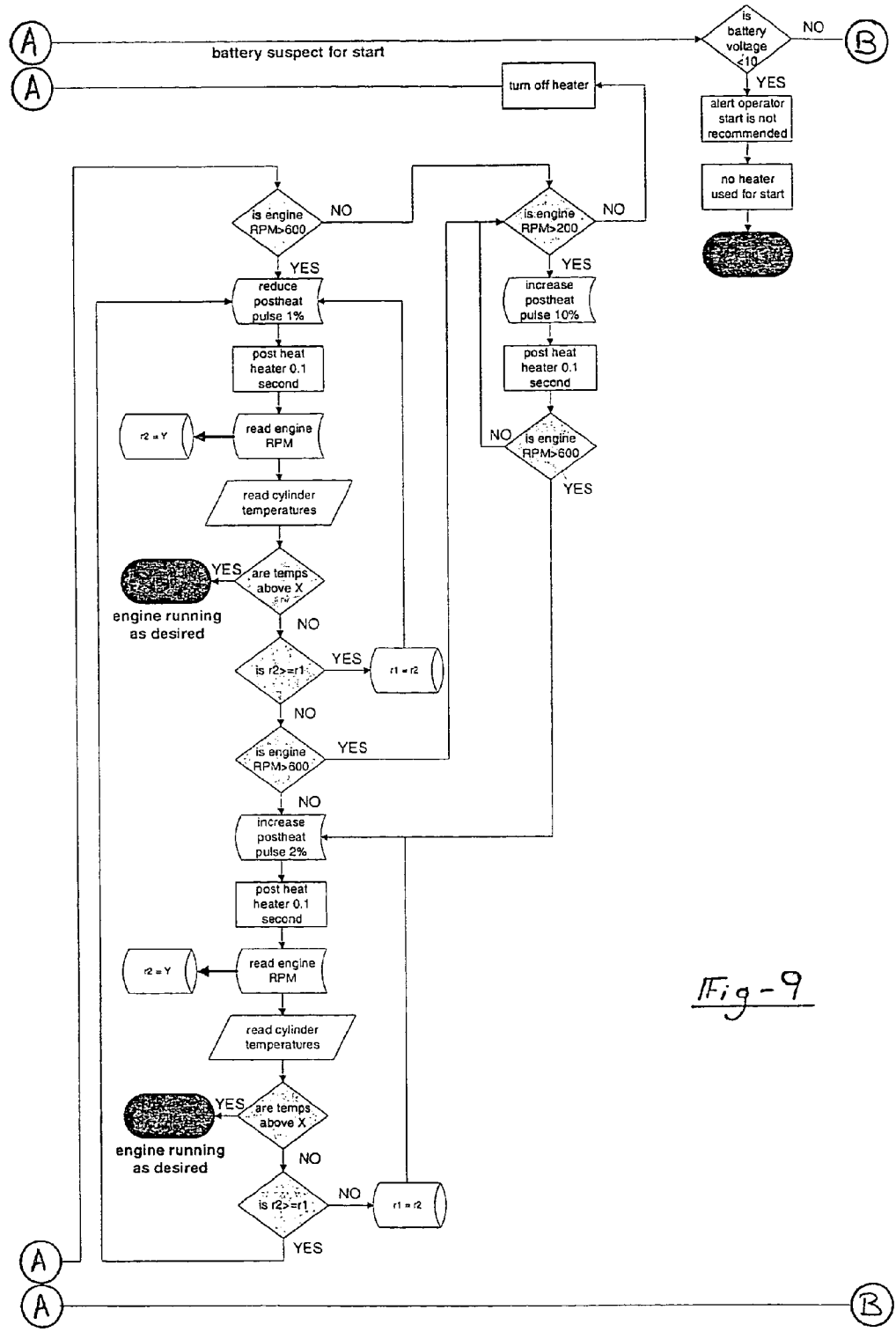
Figure 10:
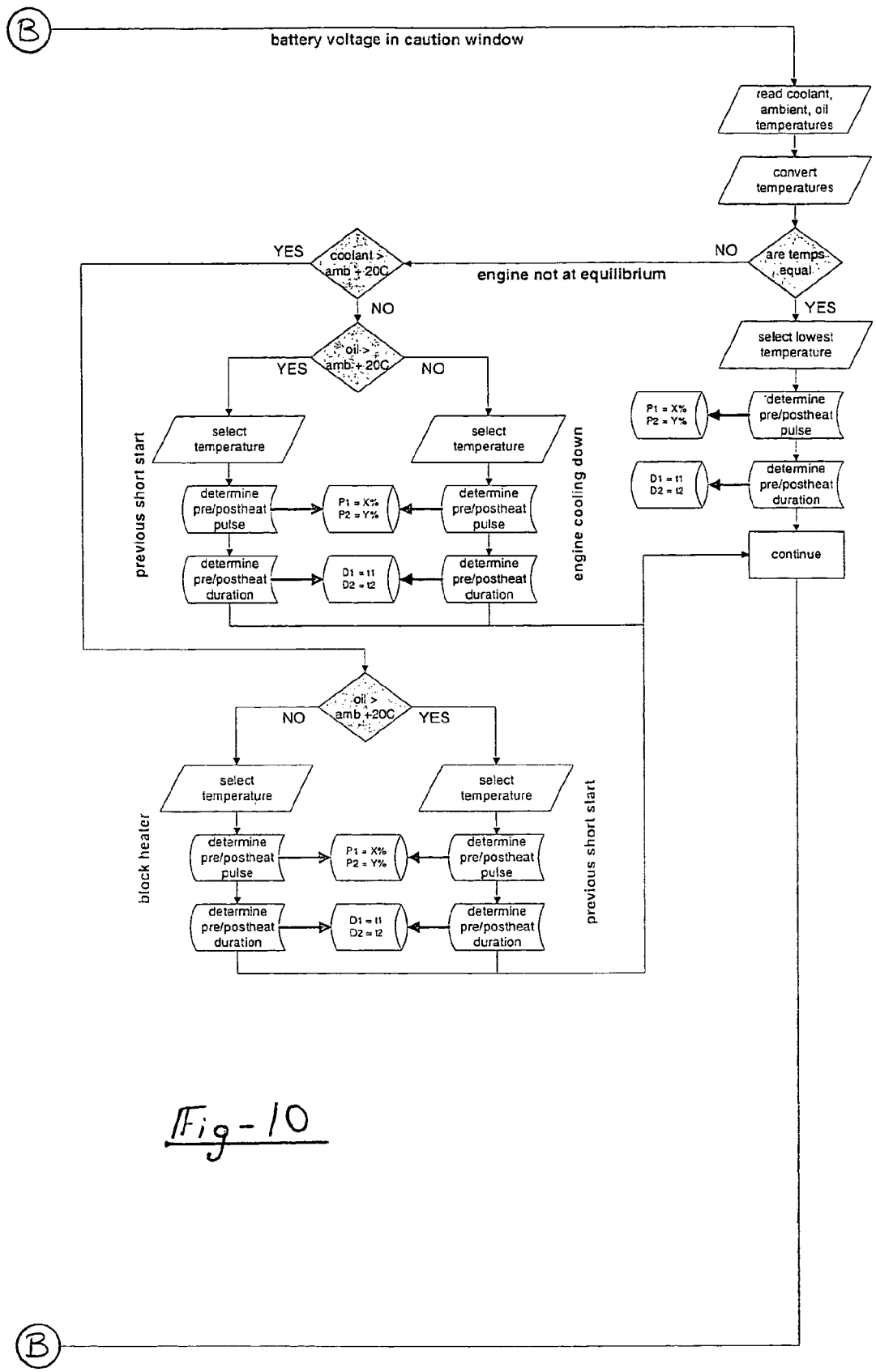

FIGS. 8-10 depict a process for operating a heater system of the present invention. As the ignition switch 52 is turned on, power is sent to the controller 26 and the engine ECM 42. The ECM 42 sends the data from the sensors and the diagnostic bank to the controller which in turn determines the correct preheat algorithm for starting the engine The heater will be powered to reach the necessary preheat generally at 100% power, however, it could be lower than this. Once preheat is complete, the driver will be signaled that the engine is ready for start. The controller will continue to take data from the ECM and determine the required pulse width modulating duty cycle to keep the vehicle running by monitoring the temperatures and the engine RPM.

A beginning modulation will be determined given the engine parameters at the beginning of the start. Colder temperatures will require a higher percentage of on time. Warmer temperatures equate to a lower percentage. Also, the percentage on time will be increased if the engine is not up to a sufficient rpm. Once an acceptable rpm is achieved, the controller will reduce the on time percentage and check the engine rpm. If the rpm remains constant, the on time percentage can be reduced. If the rpm dips, the on time percentage will be increased. As the engine warms, rpm will tend to remain constant as the controller drops the on time percentage until the controller eventually turns itself off.

Figure 11:
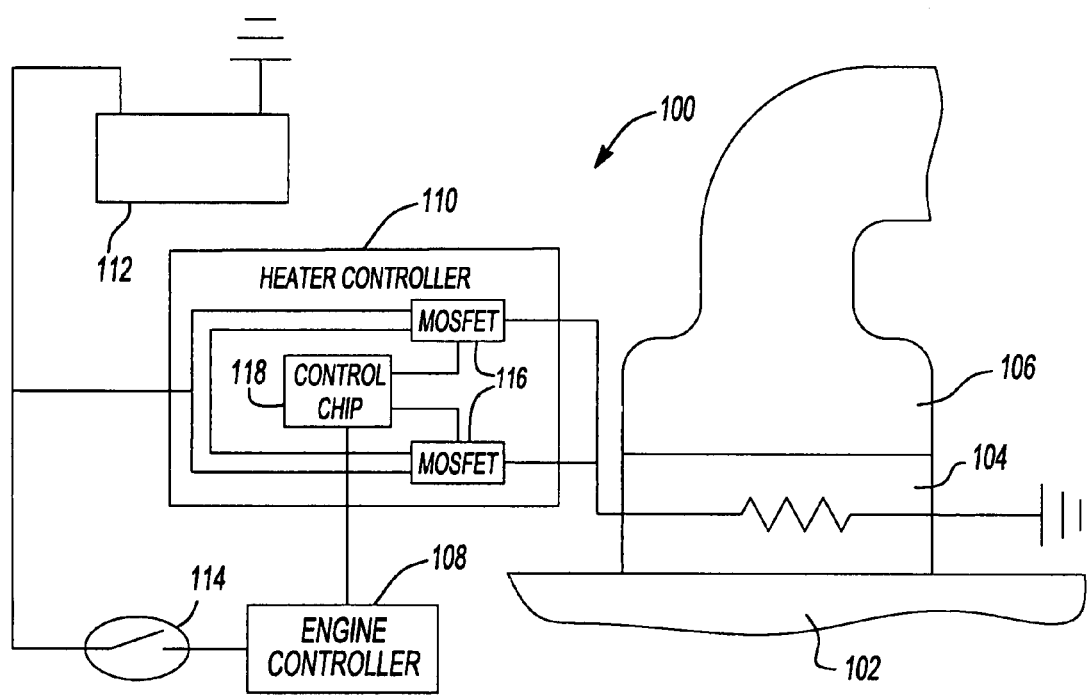
FIG. 11 is a schematic representing an alternate embodiment air intake heater control system.

FIG. 11 depicts a simplified and preferred embodiment air heater system 100 for heating air that enters the intake of an internal combustion engine 102. FIG. 11 depicts an air heater 104 positioned between engine 102 and an inlet tube 106. However, this positioning is merely exemplary and air heater 104 is preferably coupled to inlet tube 106 and configured as a "drop-in" type as depicted in FIG. 1A.

System 100 includes an engine controller 108 and a heater controller 110 in communication with one another. A battery 112 provides electrical energy to heater controller 110 and engine controller 108. An ignition switch 114 is operable to selectively supply power to engine controller 108.

Heater controller 110 includes MOSFET type transistors 116 arranged in parallel and a control chip 118. MOSFETs 116 are controlled using pulse width modulation as described previously in reference to heater systems 22 and 40. As such, the energy output of air heater 104 may be regulated.

It should be appreciated that simplified system 100 does not include additional sensors to provide signals to control chip 118. On the contrary, simplified system 100 places control chip 118 in communication with engine controller 108. Recently manufactured automotive vehicles typically include an engine control system with a controller such as engine controller 108 as part of the original equipment. Accordingly, it is possible to provide a relatively simple and low cost air heater system 100 by utilizing preexisting engine controller 108.

In operation, a user closes ignition switch 114 to provide battery power to engine controller 108. Engine controller 108 determines the appropriate preheat algorithm for starting engine 102 based on data provided by the vehicle manufacturer's sensors that are in communication with engine controller 108. Engine controller 108 provides a signal to control chip 118 of heater controller 110. Typically, heater 104 will be operated at 100% power until engine controller 108 provides a signal to heater controller 110. Once preheating has been completed, engine controller 108 will signal the vehicle operator that the engine is ready for start. The operator now turns the ignition switch to engage the starter with the engine. As the engine cranks, air will flow through inlet tube 106, through heater 104 and into engine 102. The engine controller 108 will output a signal to continue preheating or discontinue preheating depending on the engine manufacturer's specifications.

As the engine is being turned over, warm air enters the combustion chamber and mixes with injected fuel to aid in an engine start. Once the engine is started, the engine controller 108 collects data from the vehicle manufacturer's sensors and determines if a post heat program should begin. The post heat algorithm is programmed into engine controller 108 and may use data such as coolant temperature, engine rpm, vehicle exhaust temperature data and the like as provided by the vehicle manufacturer's sensors.

Heater controller 110 may be programmed to vary the heater wattage through the use of pulse width modulation to vary the preheat and/or post heat energy output of heater 104. Depending on the type of signal that is received from engine controller 108, control chip 118 may be programmed to include a control algorithm to assure proper operation of air heater 104.

MOSFET 116 may include diagnostic capabilities. This type of field effect transistor is often referred to as a "SmartFET." Siemens and/or Infineon Technologies provide a high current power switch SmartFET known as PROFET® BTS555 TO-218AB/5 that may be used in simplified system 100. The PROFET® Data Sheet BTS555 is hereby incorporated by reference. The SmartFET provides overload protection, current limitation, short circuit protection, over temperature protection, over voltage protection and reverse polarity battery protection. Because air intake heaters are susceptible to over voltage, over current and over temperature, this control technology allows for simple system protection integrated with the heater controller. Current controller technology requires separate circuitry to provide this benefit. For example, electrical elements such as fuses, circuit breakers and relays may be required. Furthermore, it should be appreciated that multiple MOSFET elements may be arranged in parallel to meet the power requirements of heater 104 if necessary.

Figure 12:
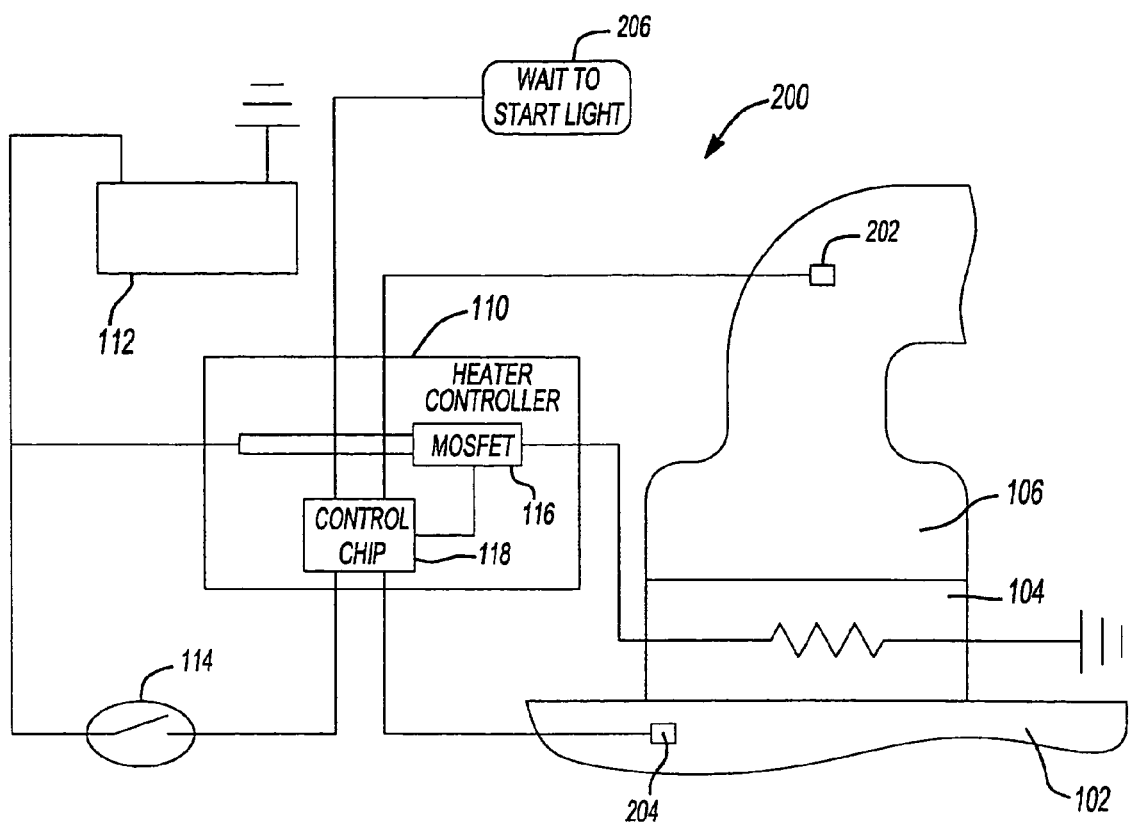
FIG. 12 is a schematic representing another alternate embodiment air intake heater control system.

FIG. 12 shows an alternate embodiment heater control system 200. System 200 is substantially similar to system 100 with the exception that system 200 does not utilize communications from an engine controller but collects data from two temperature sensors to define heater operation. Due to the similarity of components between system 200 and system 100, like elements will retain their previously introduced reference numerals.

System 200 includes an upstream temperature sensor 202 to measure the temperature of air upstream of heater 104. Upstream temperature sensor 202 provides a signal to control chip 118 indicative of the temperature of the air within inlet tube 106. A downstream temperature sensor 204 is positioned within the intake air stream at a location after air passes by air heater 104. Downstream temperature sensor 204 is depicted as being mounted within engine 102. However, it should be appreciated that other mounting locations of both heater 104 and downstream temperature sensor 204 may be implemented. For example, each of upstream temperature sensor 202, air heater 104 and downstream temperature sensor 204 may all be mounted within inlet tube 106 without departing from the scope of the present invention.

To operate system 200, ignition switch 114 is closed to provide battery power to heater controller 110. Heater controller 110 determines the correct preheat algorithm for starting the engine given data provided by upstream temperature sensor 202. If preheat is required, heater controller 110 energizes a "wait to start" light 206 that is mounted in a location visible by the operator. Heater 104 operates until heater controller 110 determines that the preheat cycle is complete. Air heater 104 may be operated at substantially any percentage of power up to 100% as may be desirable. Once the preheating cycle is complete, heater controller 110 signals that the engine is ready for start by de-energizing wait to start light 206.

To attempt to start the engine, the vehicle operator turns the ignition switch further to rotate the engine with a starter motor. As the starter cranks the engine, heater controller 110 may continue to preheat or discontinue preheat until the engine is started. Either mode of operation may be designed into the algorithm within heater controller 110. As the engine is turned over, air will flow through inlet tube 106, through heater 104 and into engine 102. Once the engine starts, heater controller 110 uses a post heat algorithm to analyze data from upstream temperature sensor 202 and/or downstream temperature sensor 204 to determine the post heat duration.

The post heat algorithm may be developed in a variety of different configurations. In one example, heater 104 is operated at different power levels for various durations of time until the air temperature sensed by upstream temperature sensor 202 is equal to a certain value. This control scheme allows the temperature of air flowing downstream of air heater 104 to remain substantially constant throughout engine operation. System 200 incorporates this primary control algorithm within the programming of heater controller 110. Furthermore, heater controller 110 may be programmed to vary the heater wattage through the use of pulse width modulation of MOSFET 116.

In a preferred alternate example, the post heat algorithm used within system 200 evaluates the signals output by upstream temperature sensor 202 and downstream temperature sensor 204 immediately after engine start. The temperature measured by downstream temperature sensor 204 is compared with a target intake air temperature. The target intake air temperature is previously defined and is programmed as part of the post heat algorithm. A desired heater wattage output is determined based on the difference between the air temperature located at downstream temperature sensor 204 and the target temperature. An appropriate pulse width modulation cycle is output to heater 104 to produce the desired wattage.

As the temperature of air passing upstream temperature sensor 202 increases toward the target temperature previously defined in relation to downstream temperature sensor 204, the output of heater 104 is adjusted. Specifically, the pulse width modulation cycle provided to heater 104 is modified to reduce the wattage output of the heater. When the air located at upstream temperature sensor 202 reaches the target temperature, power to heater 104 is discontinued. Alternatively, the algorithm within system 200 may be configured to continue post heat at a desired reduced level for a defined period of time once the temperature of upstream temperature sensor 202 equals the target temperature.

In yet another alternate embodiment, a system similar to system 200 may include preheat and post heat algorithms to evaluate data provided by sensors collecting information such as coolant temperature, engine speed, ambient air temperature and engine exhaust data.

In another embodiment, it is contemplated to control an air heater system having air heater 24 and/or air heater 104 using engine load as a control parameter. Poor combustion conditions may exist soon after the engine has been started. As such, it may be desirable to heat the intake air to address poor combustion conditions especially if an increased load condition is soon to occur. One example set of conditions where it may be beneficial to heat the intake air exists after the engine has started and a parasitic load is added to the engine. Hydraulic pumps powered by the engine are exemplary devices providing such loads.

Alternatively, the vehicle operator may wish to move the vehicle soon after the engine has been started. A change from idle speed in a neutral gear to an attempted acceleration in a drive gear provides a great change in load on the engine. To achieve better combustion efficiency during this change, it may be beneficial to heat the intake air before it enters the combustion chambers. Controller 26 or control module 42 may provide power to the air heater based on any number of vehicle operating parameters indicative of engine load including throttle position, engine speed, engine exhaust data and transmission gear either alone or in combination with one another.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An air intake heater system for a vehicle, the heater system comprising:
    an air heater adapted to be positioned in communication with an intake passageway of an engine; and
    a controller operable to modulate power to the air heater, said controller including a field effect transistor operable to repeatedly supply and discontinue the supply of power to said air heater to vary the energy output of said heater, wherein said field effect transistor is operable to sense the current supplied to said air heater and discontinue the supply of current if said current exceeds a predetermined value.

2. The air intake heater system of claim 1 wherein said controller includes a second field effect transistor arranged in parallel with said field effect transistor.

3. The air intake heater system of claim 2 further including an engine control module in communication with said controller, wherein said engine control module is operable to receive a signal from a vehicle sensor and transmit said vehicle sensor signal to said controller to define the magnitude and duration of power supply to said heater.

4. The air intake heater system of claim 3 wherein said vehicle sensor is selected from the group consisting of an oil temperature sensor, a coolant sensor, an engine cylinder temperature sensor and an ambient air temperature sensor.

5. The air intake heater system of claim 1 wherein said controller includes a MOSFET transistor operable to rapidly supply and discontinue the supply of power to said air heater.

6. The air intake heater system of claim 1 wherein said controller is operable to vary the frequency of alternately supplying and discontinuing the supply of power to said air heater to control the energy output of the heater.

7. The air intake heater system of claim 1 wherein said controller is operable to determine a time duration to supply power to said air heater prior to starting the engine.

8. The air intake heater system of claim 1 wherein said field effect transistor is operable to sense temperature and disconnect power to said air heater when a predetermined temperature is exceeded.

9. The air intake heater system of claim 8 wherein the temperature sensed by said field effect transistor includes the field effect transistor's operating temperature.

10. The air intake heater system of claim 1 wherein said field effect transistor is operable to detect a reverse polarity supply of power.

11. An air intake heater system for a vehicle, the heater system comprising:
   an air heater adapted to be positioned in communication with an intake passageway of an engine;
   a controller operable to modulate power to the air heater, said controller including a field effect transistor operable to repeatedly supply and discontinue the supply of power to said air heater to vary the energy output of said heater;
   a first temperature sensor operable to provide a signal indicative of the air temperature located upstream of said air heater; and
   a second temperature sensor operable to provide a signal indicative of the air temperature located downstream of said air heater, wherein the controller is operable to modulate power to the air heater as a function of the output of the first and second temperature sensors.

12. The air intake heater system of claim 11 wherein the controller is operable to modulate power to the air heater as a function of the engine load.

13. The air intake heater system of claim 11 wherein said controller includes another field effect transistor arranged in parallel with said field effect transistor to repeatedly supply and discontinue the supply of power to said air heater to vary the energy output of said heater.

* * * * *